United States Patent
Ruby et al.

(10) Patent No.: US 7,796,957 B2
(45) Date of Patent: Sep. 14, 2010

(54) IMPEDANCE TRANSFORMATION IN A DUPLEXER USING A TRANSMISSION LINE

(75) Inventors: Richard C. Ruby, Menlo Park, CA (US); Paul Bradley, Los Altos, CA (US); Michael L. Frank, Los Gatos, CA (US)

(73) Assignee: Avago Technologies Wireless IP (Singapore) Pte. Ltd., Singapore (SG)

( * ) Notice: Subject to any disclaimer, the term of this patent is extended or adjusted under 35 U.S.C. 154(b) by 486 days.

(21) Appl. No.: 11/076,615

(22) Filed: Mar. 10, 2005

(65) Prior Publication Data

US 2006/0205361 A1 Sep. 14, 2006

(51) Int. Cl.
*H04B 1/44* (2006.01)

(52) U.S. Cl. .................. 455/78; 455/278; 455/575.7
(58) Field of Classification Search ............... 455/78
See application file for complete search history.

(56) References Cited

U.S. PATENT DOCUMENTS

| 4,672,685 | A | * | 6/1987 | Phillips et al. | ........... 455/575.7 |
| 5,023,866 | A | * | 6/1991 | De Muro | ........... 370/278 |
| 5,903,820 | A | * | 5/1999 | Hagstrom | ........... 455/82 |
| 2006/0057987 | A1 | * | 3/2006 | Nail et al. | ........... 455/168.1 |

\* cited by examiner

*Primary Examiner*—Duc Nguyen
*Assistant Examiner*—Ajibola Akinyemi

(57) ABSTRACT

A duplexer having a filter and a transmission line that transforms an impedance of the filter to an impedance of an antenna.

14 Claims, 1 Drawing Sheet

IMPEDANCE TRANSFORMATION IN A DUPLEXER USING A TRANSMISSION LINE

BACKGROUND

A duplexer is a device that enables the simultaneous transmission and reception of signals via an antenna. A duplexer includes a transmit filter and a receive filter. The transmit filter passes energy in a transmit band from a transmitter to the antenna and blocks energy outside of the transmit band. The receive filter passes energy in a receive band from the antenna to a receiver and blocks energy outside of the receive band. A duplexer may include a quarter wave transmission line that provides a 90 degree phase shift that prevents the receive filter from excessively loading the transmit filter.

A duplexer is commonly implemented to match its impedance with the impedance of an antenna connected to the duplexer. For example, an antenna connected to a duplexer typically has an impedance of 50 Ohms. As a consequence, the transmit and receive filters in a duplexer are typically implemented with 50 Ohms impedances. In addition, a quarter wave transmission line in a duplexer is typically implemented with a 50 Ohm impedance.

A duplexer implemented with a relatively low impedance receive filter, e.g. 50 Ohms, may have a variety of disadvantages. For example, a receiver that connects to the receive filter of a duplexer may have a relatively high input impedance. As a consequence, a matching network may be needed between the receiver and the receive filter of the duplexer. Unfortunately, a matching network may increase the cost of a receiver and may cause a signal loss into a receiver. In addition, a low impedance receive filter in a duplexer may impose a lower limit on the overall size of the receive filter, thereby further increasing the cost.

SUMMARY OF THE INVENTION

A duplexer is disclosed having a filter and a transmission line that transforms an impedance of the filter to an impedance of an antenna. The impedance transformation provided by the transmission line enables the filter to be implemented with significantly higher impedance than the impedance of the antenna, thereby avoiding the use of matching networks and facilitating miniaturization of a system that employs a duplexer according to the present teachings.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
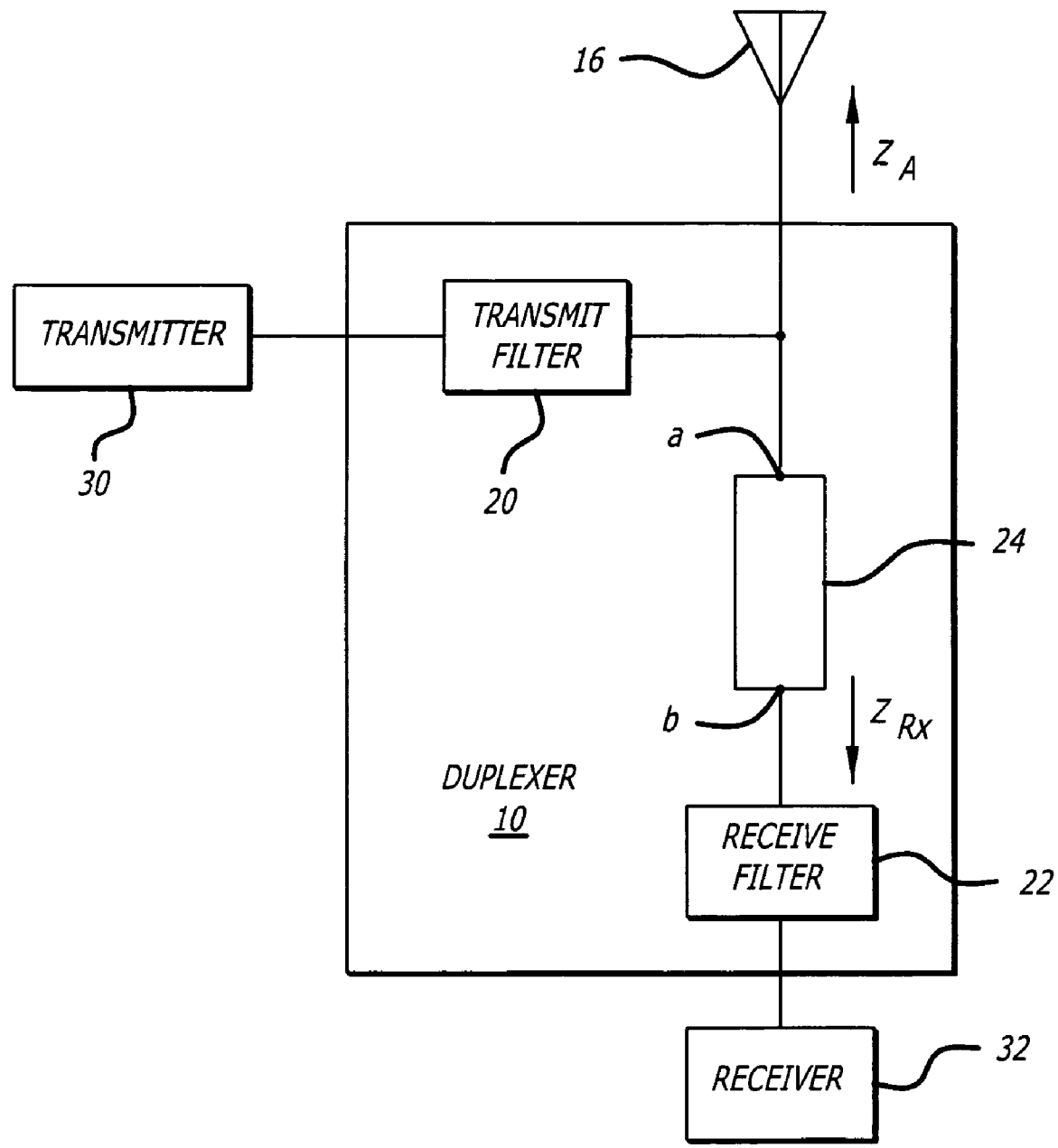
FIG. 1 shows a duplexer according to the present techniques.

FIG. 1 shows a duplexer 10 according to the present techniques. The duplexer 10 enables a transmitter 30 and a receiver 32 to transmit and receive signals via an antenna 16. The duplexer 10 includes a transmit filter 20, a receive filter 22, and a transmission line 24.

The transmit filter 20 passes energy in a transmit band from the transmitter 30 to the antenna 16 and blocks energy outside of the transmit band. The receive filter 22 passes energy in a receive band from the antenna 16 to the receiver 32 and blocks energy outside of the receive band. The duplexer may be contained in a cellular communication station, e.g. a portable handset. In one embodiment, the transmit band is 1850-1910 MHz and the receive band is 1930-1990 MHz in accordance with a cellular communication standard. In another embodiment, the transmit and receive bands are in an 800 MHz region in accordance with another cellular communication standard.

The transmission line 24 transforms the impedance of receive filter 22 ($Z_{Rx}$) to match the impedance of an antenna 16 ($Z_A$). In one embodiment, the transmission line 24 is a quarter wave transmission line at the frequency of the transmit filter 20.

The transformation of the impedance of the receive filter 22 $Z_{Rx}$ to the impedance of the antenna 16 $Z_A$ is accomplished by selecting the impedance of the transmission line 24 ($Z_L$) to be a geometric mean of $Z_{Rx}$ and $Z_A$ according to the following equation.

$$Z_L = \mathrm{sqrt}(Z_{Rx} * Z_A)$$

The impedance of the transmit filter 20 is also matched to $Z_A$.

In one embodiment, the impedance of the receive filter 22 $Z_{Rx}$ is 200 Ohms and the impedance of the antenna 16 $Z_A$ is 50 Ohms. These values yield a geometric mean for the impedance of the transmission line 24 $Z_L$ of 100 Ohms as follows.

$$Z_L = \mathrm{sqrt}(200*50) = 100$$

For the quarter wave transmission line 24, the impedances at its a and b terminals connected to the antenna 16 and the receive filter 22, respectively, are as follows.

$$Z_{La} = Z_L^2 / Z_{Rx} = 100*100/200 = 50 \text{ Ohms}$$

$$Z_{Lb} = Z_L^2 / Z_A = 100*100/50 = 200 \text{ Ohms}$$

Thus, the impedance at the terminal a of the transmission line 24 matches to the 50 Ohm impedance of the antenna 16 and the impedance at the terminal b of the transmission line 24 matches to the 200 Ohm impedance of the receive filter 22.

The impedance transformation provided by the transmission line 24 enables the use of higher impedance structures on the receive side of the duplexer 10. For example, the higher impedance at the terminal b enable the use of a relatively high impedance low noise input amplifier in the receiver 32. In addition, the impedance transformation provided by the transmission line 24 enables the implementation of small structures, e.g. a smaller die, on the receive side of the duplexer 10.

The desired impedance of the transmission line 24 may be accomplished by forming the appropriate geometry of transmission line structures on a substrate that holds the duplexer 10 using known techniques. For example, the width of conductor structures and the height above a ground plan in the transmission line 24 may be selected to provide the desired impedance for the transmission line 24. In one embodiment, the length of the transmission line 24 may be selected to provide a 90 degree phase shift in the transmit band of the transmit filter 20 to prevent excessive loading of the transmitter 30.

In one embodiment, the duplexer 10 is formed with acoustic filter sections for the transmit filter 20 and the receive filter 22.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A duplexer comprising a filter and a transmission line that transforms an impedance of the filter to an impedance of an antenna, wherein the transmission line has an impedance that is a geometric mean of the impedances of the filter and the antenna, wherein the geometric mean of the impedance is given by:

$$Z_L = (Z_{RX} * Z_A)^{1/2}$$

where $Z_L$ is the impedance of the transmission line, $Z_{RX}$ is the impedance of the filter, and $Z_A$ is the impedance of the antenna.

2. The duplexer of claim 1, wherein the transmission line is a quarter wave transmission line at a frequency of a transmit filter of the duplexer.

3. The duplexer of claim 1, wherein the filter is a receive filter.

4. The duplexer of claim 1, wherein a length of the transmission line is selected to provide a 90 degree phase shift in a transmit band of a transmit filter of the duplexer.

5. The duplexer of claim 1, wherein the impedance transformation provided by the transmission line enables the use of higher impedance structures on a receive side of the duplexer.

6. A method for impedance matching in a duplexer, the method comprising: transforming an impedance of a filter in the duplexer to an impedance of an antenna, wherein the transforming comprises:

selecting an impedance of a transmission line to have a geometric mean of the impedance of the filter and the impedance of the antenna, wherein the geometric mean is given by:

$$Z_L = (Z_{RX} * Z_A)^{1/2}$$

where $Z_L$ is the impedance of the transmission line, $Z_{RX}$ is the impedance of the filter, and $Z_A$ is the impedance of the antenna.

7. The method of claim 6, wherein transforming comprises transforming using a quarter wave transmission line at a frequency of a transmit filter of the duplexer.

8. The method of claim 6, wherein transforming comprises transforming an impedance of a receive filter in the duplexer to the impedance of the antenna.

9. The method of claim 6, further comprising selecting a length of the transmission line to provide a 90 degree phase shift in a transmit band of a transmit filter of the duplexer.

10. A cellular communication station, comprising:
an antenna;
a filter; and
a duplexer having a transmission line that transforms an impedance of the filter to an impedance of the antenna, wherein the transmission line has an impedance that is a geometric mean of the impedance of the filter and the impedance of the antenna, wherein the geometric mean is given by:

$$Z_L = (Z_{RX} * Z_A)^{1/2}$$

where $Z_L$ is the impedance of the transmission line, $Z_{RX}$ is the impedance of the filter, and $Z_A$ is the impedance of the antenna.

11. The cellular communication station of claim 10, wherein the transmission line is a quarter wave transmission line at a frequency of a transmit filter of the duplexer.

12. The cellular communication station of claim 10, wherein the filter is a receive filter.

13. The cellular communication station of claim 10, wherein a length of the transmission line is selected to provide a 90 degree phase shift in a transmit band of a transmit filter of the duplexer.

14. The cellular communication station of claim 10, further comprising a structure on a receive side of the duplexer having a higher impedance than the impedance of the antenna.

* * * * *